3,083,147
DEHYDRATION OF PROPANE BY DISTILLATION
AND SIDE STREAM RECOVERY
Marion L. Arnold, Downey, Calif., assignor to Richfield Oil Corporation, Los Angeles, Calif., a corporation of Delaware
Filed Nov. 14, 1952, Ser. No. 320,420
3 Claims. (Cl. 202—42)

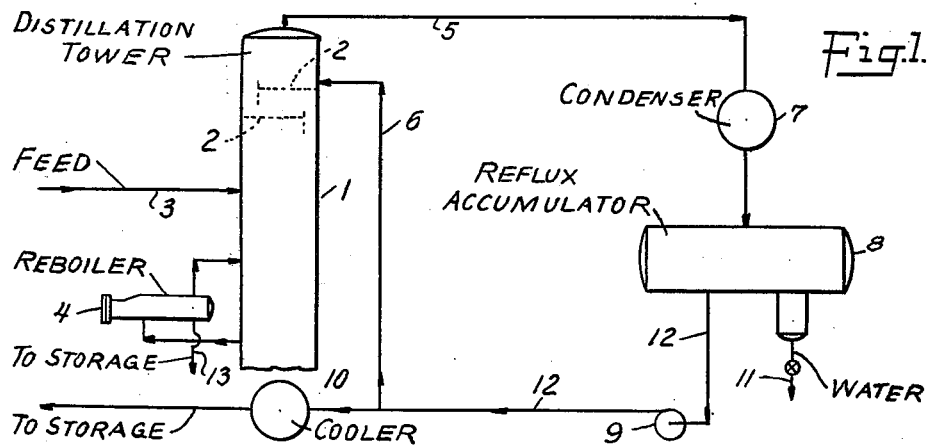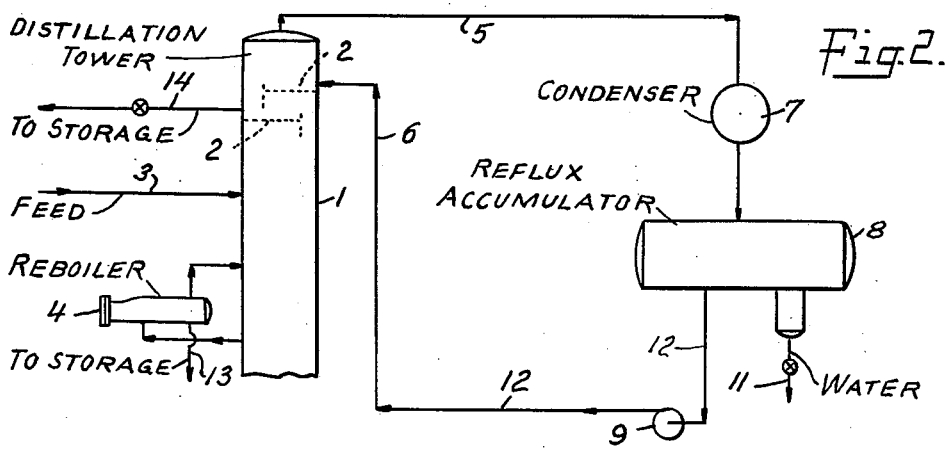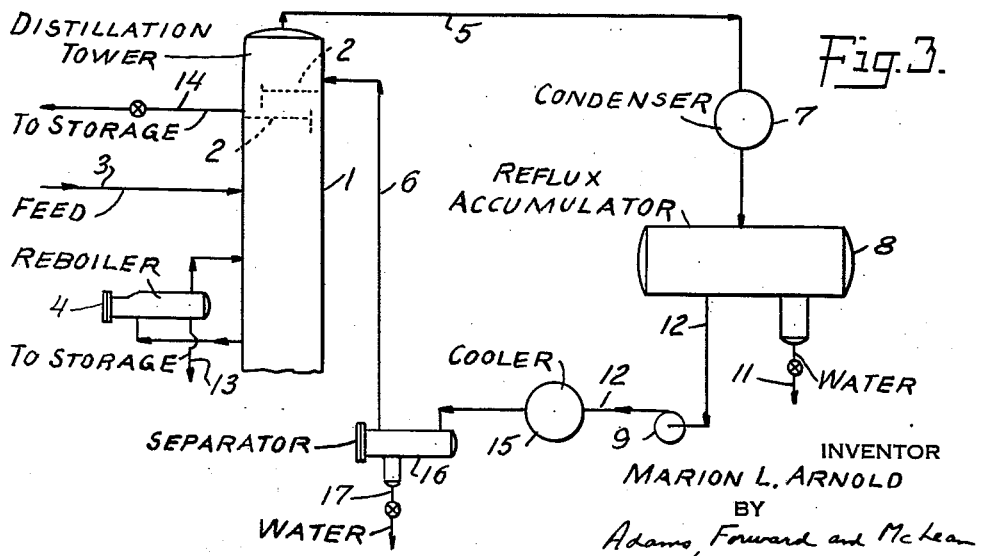

My invention relates to an improved process for the production of liquid lower boiling hydrocarbons.

In many natural gasoline plants, commercial propane is produced by charging to a fractionating column a feed stock which is substantially free of methane and ethane. This feed stock is generally saturated with water. The propane is distilled overhead and, because of its thermodynamic properties, the water contained in the feed passes overhead with the propane. Hence, this propane vapor, when condensed, will yield a liquid which is also saturated with water and, as a rule, a separate water phase which is drawn off as such. The solubility of water in propane decreases with a decrease in temperature. Since the temperature at which the propane vapor is condensed is normally higher than atmospheric, liquid water separates out as the propane cools to atmospheric temperature in transfer lines, storage tanks, etc. This water collects at low points in the system and promotes corrosion, may freeze in cold weather, and is otherwise troublesome. A similar problem arises in the production of other lower boiling hydrocarbons from admixtures composed of such hydrocarbons, higher boiling hydrocarbons and water.

In accordance with my invention, I have devised a process whereby it is possible to fractionate lower boiling hydrocarbons from feed stocks which contain water with the resultant production of distillates of much lower water content. In order to compare my fractionation process with that generally used in the prior art, reference is made to the accompanying drawings in which:

FIG. 1 illustrates in highly diagrammatic form the conventional method of operating a fractionating column in order to produce a lower boiling hydrocarbon;

FIG. 2 illustrates one method of operation falling within the scope of my invention; and FIG. 3 represents another method of operation falling within the scope of my invention.

In FIG. 1, the numeral 1 illustrates a conventional bubble plate tower equipped with trays 2, feed inlet line 3, reboiler 4, vapor outlet line 5 and reflux line 6. The numeral 7 designates a condenser, below which is situated reflux accumulator 8. The numeral 9 designates a pump and the numeral 10 designates a conventional piece of cooling equipment. In operation, for example in the production of propane from natural gasoline containing very small amounts of ethane and water, the feed is introduced through line 3 to column 1, from which vapors pass overhead through line 5. These vapors are condensed in condenser 7, from which the condensed vapors flow to reflux accumulator 8. Two liquid layers are present in the reflux accumulator, one layer being composed of water which is withdrawn through line 11 and is discarded and the other of which is withdrawn through line 12. A portion of the condensed vapors flowing through line 12 is circulated by means of pump 9 through line 6 to the top of the distillation tower 1 to serve as reflux, while the remainder of the condensed vapors flowing through line 12 pass through cooler 10 and hence to storage. The depropanized feed passes to storage through line 13.

Still referring to FIG. 1, when the feed is a liquid which will yield an overhead product, the hydrocarbon component of which is composed of 0.0431 mol fraction of ethane and 0.9569 mol fraction of propane, a condenser temperature of 120° F. is required to condense the overhead completely when the column is operated at a pressure of 270 p.s.i.a. When sufficient water is present in the feed to saturate the condensed overhead vapors, such condensed vapors will contain 0.044 pound of water per 100 pounds of hydrocarbon. Any drop in temperature below 120° F. will cause water to separate from the product.

In FIG. 2, as was the case with FIG. 1, the numeral 1 designates a distillation column equipped with bubble plates 2, feed inlet 3, reboiler 4 having an outlet line 13 for withdrawal of stabilized feed, vapor outlet 5 and reflux line 6. Condenser 7 is used to condense the overhead vapors from the distillation column, and when they are condensed they pass to reflux accumulator 8, from which water is withdrawn through line 11 and reflux is returned to the top of the column through lines 12 and 6 with the aid of pump 9. When operating in accordance with the procedure set forth in FIG. 2 it will be noted, however, that the propane or other lower boiling hydrocarbon being run to storage through line 14 is a portion of the liquid overflowing from the top plate of the column.

By withdrawing the product through line 14, as is done in accordance with the method set forth in FIG. 2, rather than from the reflux accumulator, as is done in accordance with the method described in FIG. 1, I am able to produce a liquid lower boiling hydrocarbon of greatly reduced water content. At the same time, however, the hydrocarbon composition of the liquid lower boiling hydrocarbon produced will be substantially the same when the method of FIG. 2 is used as when the method of FIG. 1 is employed.

Thus, the water content of the overhead product produced by the method of FIG. 2 is given by the following formula:

$$X_p = \frac{X_o + (F/L_o)X_f}{K_1 + P/L_o}$$

in which X is the concentration of water expressed as a mol fraction; $K_1$ is the ratio of the concentration of water in the vapor phase to the concentration of water in the liquid phase for the system under consideration and at the pressure and temperature of the system; F is the mols of feed to the column; $L_o$ is the mols of reflux returned to the column; P is the mols of overhead product withdrawn from the column; and $f$, $o$ and $p$ when used as subscripts denote, respectively, feed, reflux and product. This equation is derived by making a material balance of the water entering and the water leaving the column, assuming that no water is removed with the stabilized product withdrawn through line 13 which is what happens in practice. Weight fractions rather than mol fractions can be used in the equation without significant error, due to the small concentrations of water which are normally involved. When the feed mentioned above in connection with the discussion of FIG. 1 is processed according to the method of FIG. 2 and the water content of the feed is sufficient to saturate the product when operating according to the method of FIG. 1, and the ratio of mols of feed to mols of reflux to mols of liquid lower boiling hydrocarbon withdrawn through line 13 is 1:1:0.2, the $(F/L_o)X_f$ is $(1/1)(0.2)(0.00044)$ or 0.000088. In this type of operation, a lower condenser temperature is required in order to condense the vapor passing overhead through line 5, and that temperature is 109° F. at 270 p.s.i.a., the operating pressure used above in connection with the discussion of FIG 1. According to published data, at this temperature $X_0$ is 0.000382 and $K_1$ is approximately 6.2. Hence, the water content of the liquid lower boiling hydrocarbons passing through line 14 is 0.00735 pound of water per 100 pounds of hydrocarbon. With this water content, liquid will not appear as a separate phase unless the temperature is reduced below 40° F.

Further reduction in the water content of the liquid lower boiling hydrocarbon product can be accomplished by subcooling the reflux to the column and removing the water which separates, before the reflux is introduced into the column. This variation is shown in FIG. 3, in which the numerals used have the same significance as those used in FIG. 2. In the case of FIG. 3, however, cooling means 15 are situated in the reflux line intermediate the reflux accumulator and the column 1. Upon passing through cooling means 15, the reflux enters separating device 16, from which water is drawn off and discarded through line 17.

Further reduction in the water content of the liquid lower boiling hydrocarbon product produced can also be obtained by withdrawing the product from a tray or bubble plate located lower down the column. The tray selected, however, should not be so far down the column that contamination of the product with heavier components occurs.

While I have described my method particularly in connection with the separation of propane from natural gasoline, it will be apparent to those skilled in the art that it is applicable to any separation process in which there is a contaminant not miscible in all proportions with the product and for which the vapor-liquid equilibrium constant of the contaminant is greater than unity. The method of my invention is therefore applicable, for example, to the separation of butane, isobutane, isopentane, and the like, from mixtures which contain those materials as well as water and essentially homologous hydrocarbons of higher boiling point. Likewise, although a tray or plate type column has been described in connection with FIG. 1, FIG. 2 and FIG. 3, a packed type column having a suitable liquid accumulating trap at a point in the column at which it is desired to withdraw the product can also be employed. Finally, while total condensation of the overhead was effected in the figures, my method is also applicable to operations in which the overhead is not totally condensed.

I claim:
1. In a process for the production of liquid propane by the fractionation of natural gasoline containing propane, higher boiling hydrocarbons and water, in which process the natural gasoline is introduced into a fractionating column at an intermediate point thereof, the propane and water are withdrawn as vapor at an upper point thereof and condensed, and the liquid propane-containing phase of the condensate is returned to the top of the column as reflux, and said higher boiling hydrocarbons are withdrawn at a lower point thereof, the steps of withdrawing propane and water vapors from the top of the column, condensing such vapors separating water therefrom and returning the remaining propane-containing condensate to the top of the column as reflux and withdrawing the propane product as liquid at a point intermediate the top of the column and the point of introduction of the natural gasoline.

2. A method as in claim 1 in which said column is a bubble plate column and in which the liquid propane withdrawn is a portion of the liquid overflowing from the top plate of the column.

3. A method according to claim 1 in which the reflux, before being introduced into the column, is cooled and water is separated therefrom.

References Cited in the file of this patent
UNITED STATES PATENTS

| | | |
|---|---|---|
| 1,972,061 | Cox | Aug. 28, 1934 |
| 2,037,677 | Connolly et al. | Apr. 14, 1936 |
| 2,172,560 | Kemp et al. | Sept. 12, 1939 |
| 2,357,710 | Ullrich | Sept. 5, 1944 |
| 2,366,901 | Janeway | Jan. 9, 1945 |
| 2,368,497 | Shipley et al. | Jan. 30, 1945 |
| 2,471,134 | Wright | May 24, 1949 |
| 2,548,058 | Ragatz | Apr. 10, 1951 |
| 2,661,812 | Gilmore | Dec. 8, 1953 |
| 2,666,019 | Winn et al. | Jan. 12, 1954 |
| 2,672,034 | Morrow | Mar. 16, 1954 |

OTHER REFERENCES

Perry: Industrial and Engineering Chemistry, Analytical Edition, vol. 10, No. 9, 1938, pages 513 and 514.

Poettmann et al.: Petroleum Refiner, vol. 25, No. 12, December 1946, pages 635 to 638.